June 25, 1968     D. A. WILLIAMS     3,390,229
PARTICLE MEASURING AND COUNTING SYSTEM
Filed Nov. 1, 1962     8 Sheets-Sheet 2
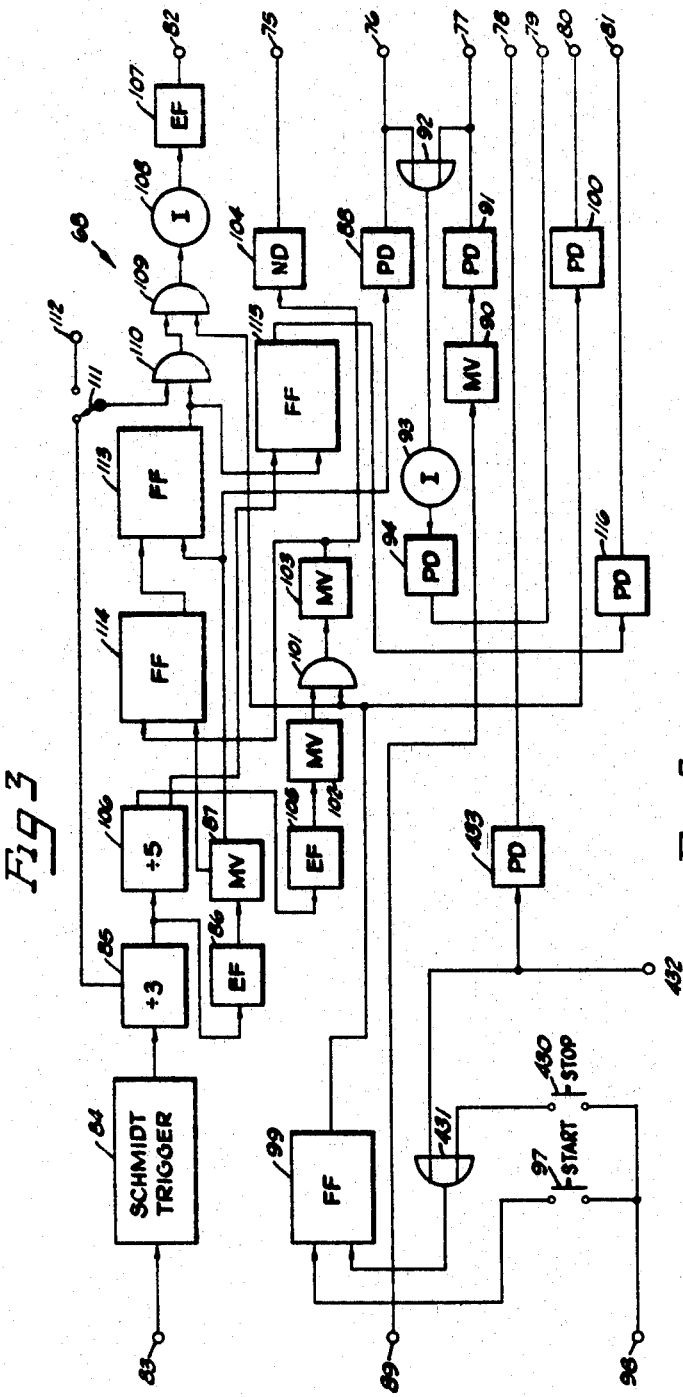
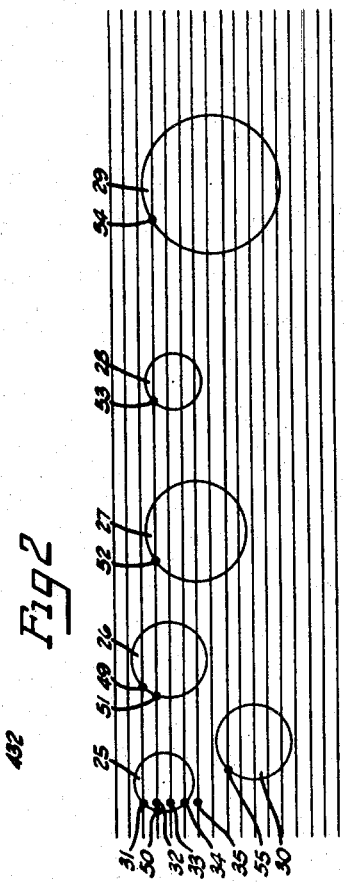
INVENTOR.
David A. Williams
BY
ATTORNEYS

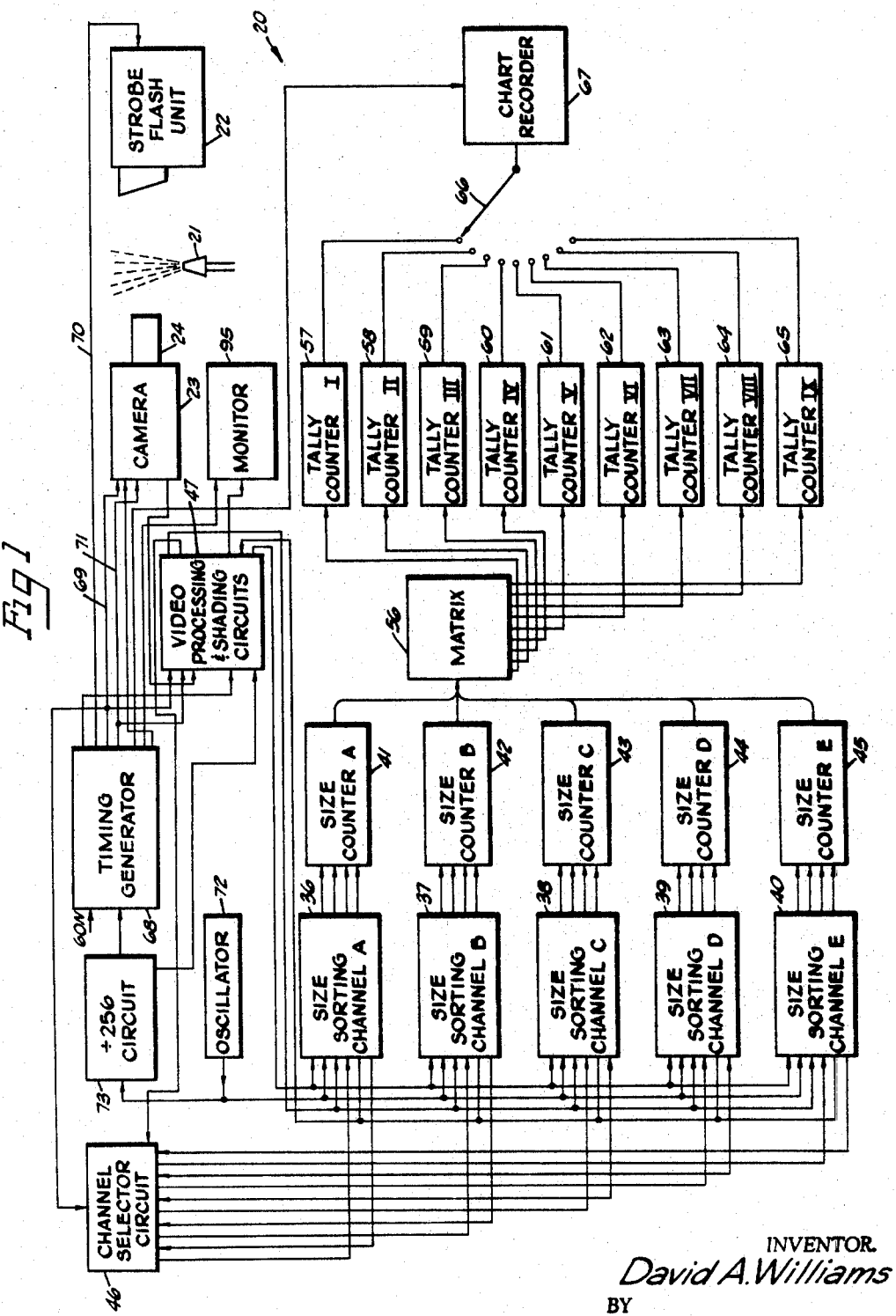

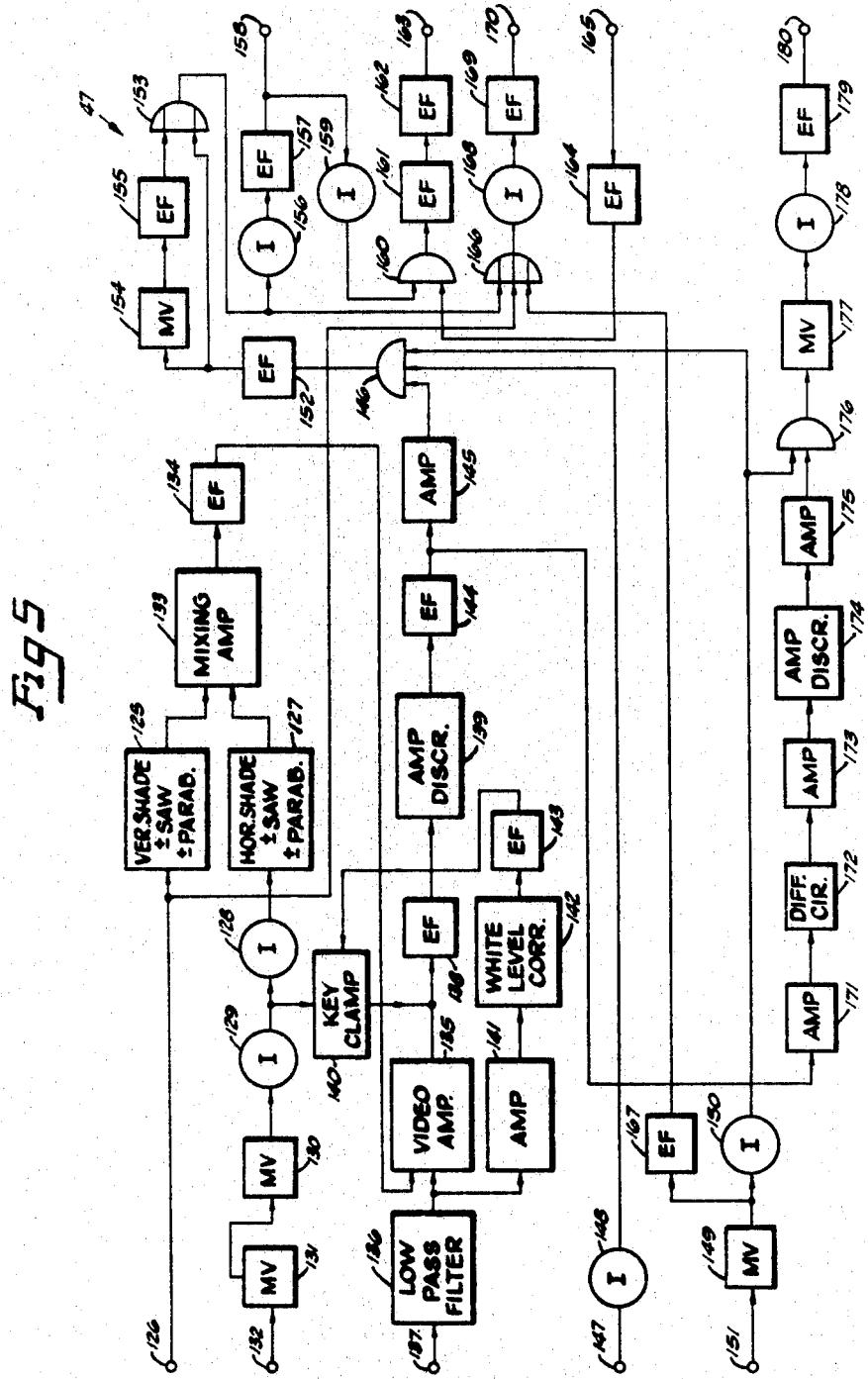

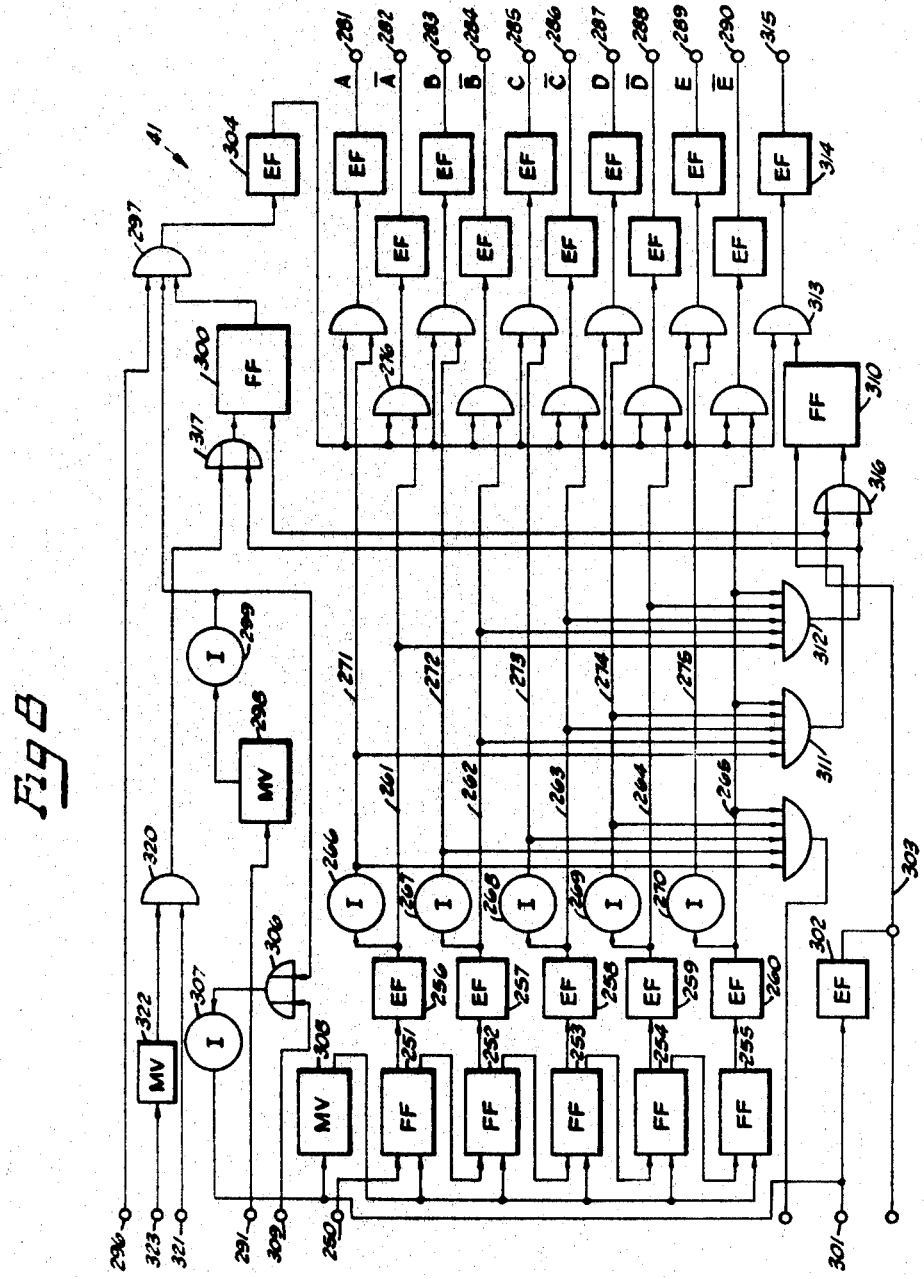

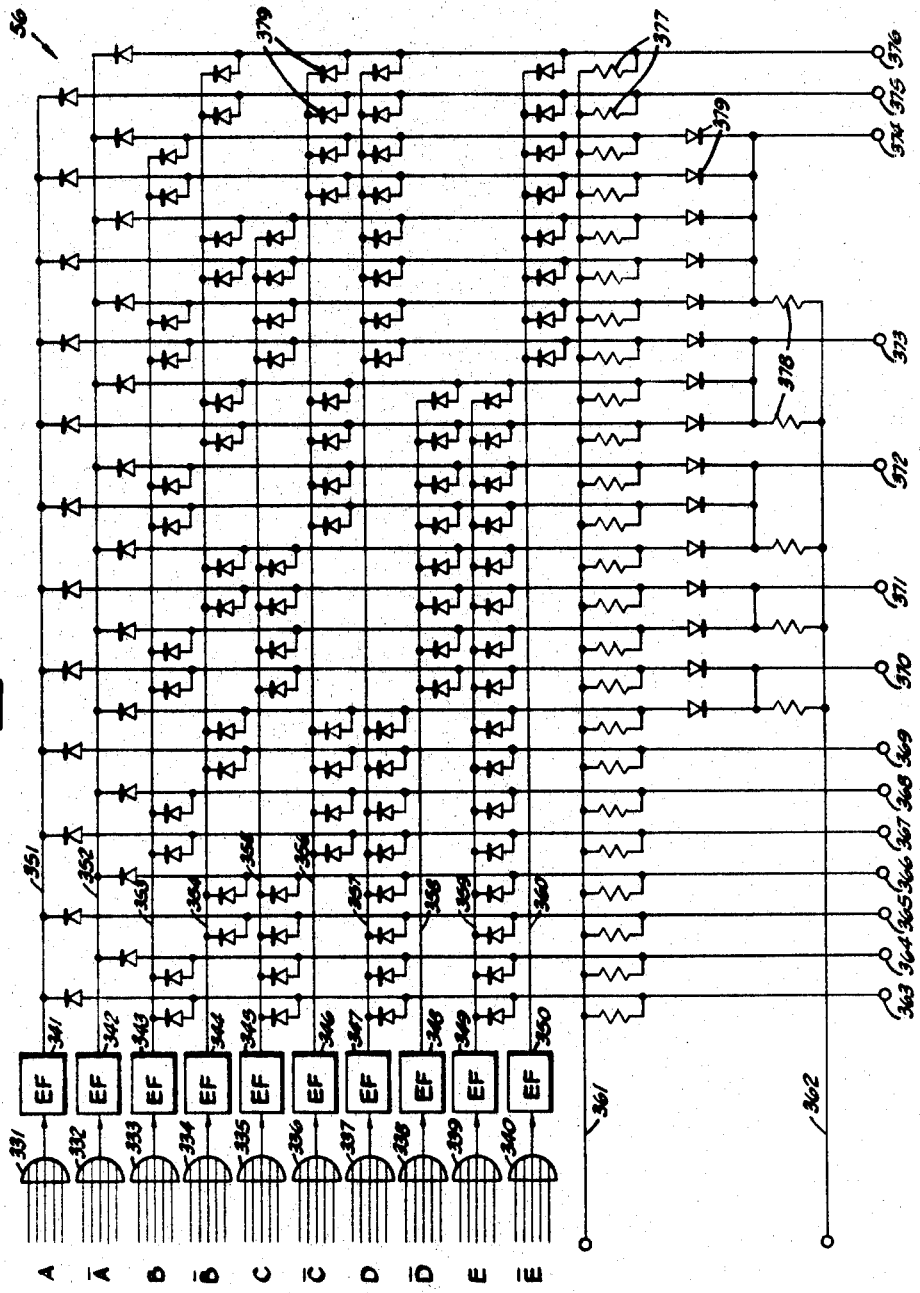

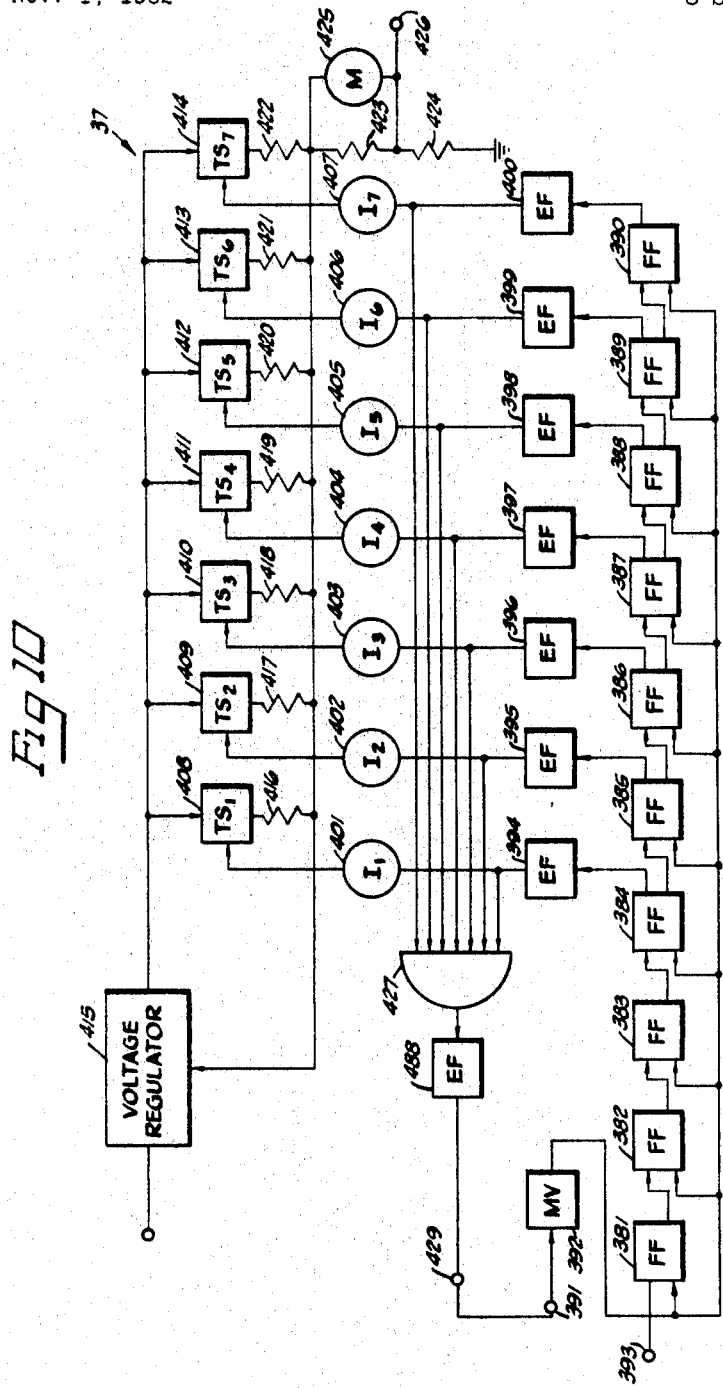

3,390,229
PARTICLE MEASURING AND COUNTING SYSTEM
David A. Williams, Michigan City, Ind., assignor, by mesne assignments, to Raytheon Education Company, a corporation of Delaware
Filed Nov. 1, 1962, Ser. No. 234,723
13 Claims. (Cl. 178—6)

This invention relates to a particle measuring and counting system and more particularly to a very efficient, accurate and reliable electronic system wherein the dimensions and numbers of particles or the like are rapidly determined from a video signal produced by scanning of an image area having images of the particles thereon.

The system disclosed herein was designed with the specific object of providing a system for the analysis of spray particles from a spray nozzle to determine characteristics of the nozzle and important features of the invention relate particularly to spray analysis. However, a general object of the invention is to provide a system having features usable in a wide range of applications, including the measurement of shape and dimensions of and size distribution of multiple images produced from blood cells, bacteria, electron microscope photographs of molecular or crystal structure, dust impurities, solid particles suspended in liquids, tracks of nuclear particles in bubble chambers, cloud chambers or nuclear emulsion, pits or flaws on metal surfaces, etc.

The present invention involves the measurement of image dimensions by means of an intercept scanning technique which is disclosed and claimed in my copending application of even date, entitled "Intercept Scanning System," Ser. No. 234,722. To measure dimensions with the intercept scanning technique, an image area is scanned to produce a video signal having pulses therein corresponding to images in the image area, and means are provided responsive to such pulses to produce output signals corresponding to dimensions of the images. Preferably, a conventional television camera is used wherein an image area on the screen of a camera tube is scanned with a "spot" from a cathode ray beam moving in a line pattern. When the scanning spot initially intercepts the image, a time delay circuit is set into operation and after a delay on the same order of magnitude as a scanning line interval, a signal is applied to a interrogation gate to determine the presence of a video signal. If the video signal is then above a certain amplitude, the time delay circuit is operated through another cycle. If not, the operation thereof is discontinued. Thus the number of cycles of operation of the time delay circuit is a measure of the number of scan lines passing through a certain portion of the image and is a measure of its dimension. With particles having images of substantially circular form, such as particles from a spray nozzle, the measurement can be performed in a direction perpendicular to the scanning lines, by using a time delay equal to the scanning line interval.

According to an important feature of the invention, the spray from a spray nozzle is automatically analyzed by using flash illumination means to develop particle images in an image area which is then scanned. A specific feature relates to the synchronization of the operation of the flash illumination and scanning means.

Further important features of the invention relate to the provision of a multi-channel system for measurement of image dimensions wherein the size of an image may be measured in each channel during or prior to completion of the measurement of the dimensions of images in other channels, to thus permit rapid analysis.

Another important feature of the invention relates to the synchronization of the operation of scanning means and the operation of time delay means used in size measurement.

Still further features of the invention relate to the connection of the size measuring system to a system for indicating and recording the distribution of images according to size.

This invention contemplates other and more specific objects, features and advantages which will become more fully apparent from the following detailed description taken in conjunction with the accompanying drawings which illustrate a preferred embodiment and in which:

FIGURE 1 diagrammatically illustrates a television spray analyzer system constructed according to this invention;

FIGURE 2 diagrammatically illustrates the upper portion of the scanning raster of the screen of the television camera of the system of FIGURE 1, showing the principles of operation of the system;

FIGURE 3 diagrammatically illustrates a timing signal generator of the system of FIGURE 1;

FIGURE 5 is a diagrammatic illustration of video processing and shading circuits of the system of FIGURE 1;

Figure 7:
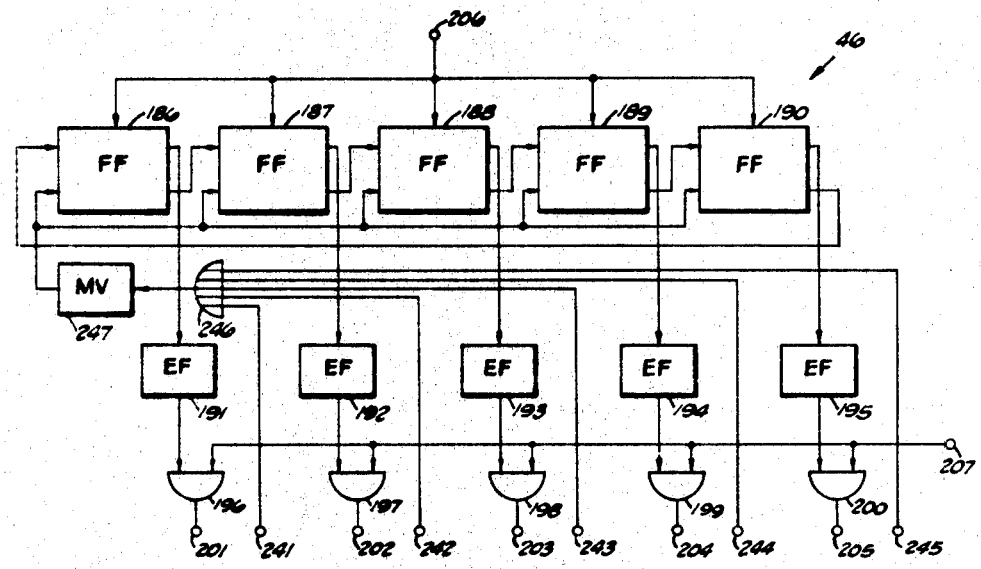
Figure 6:
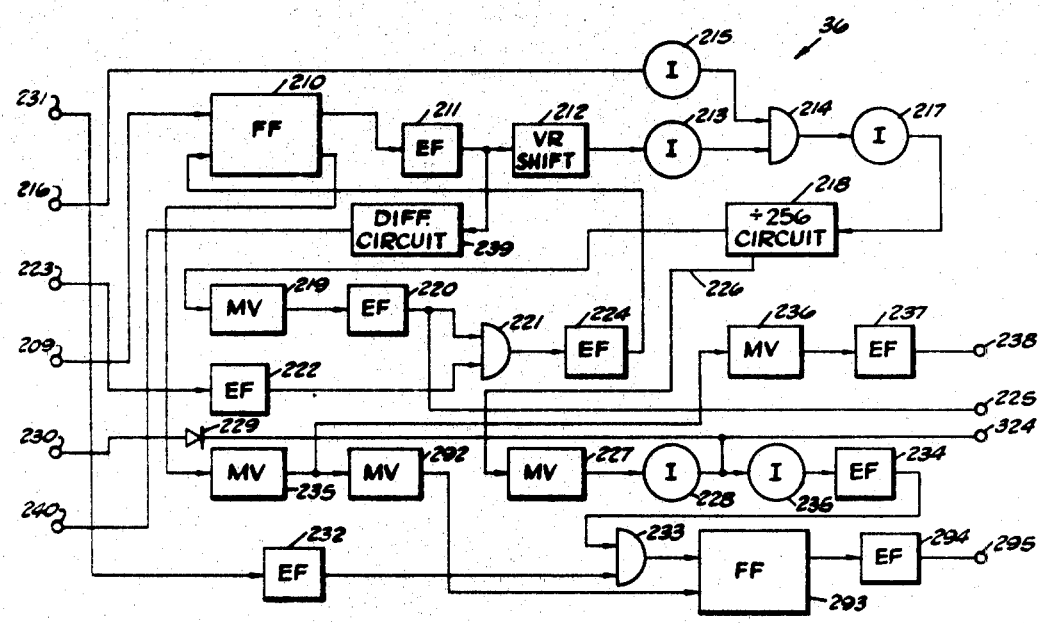

FIGURE 6 diagrammatically illustrates a channel selector circuit of the system of FIGURE 1;

FIGURE 7 diagrammatically illustrates a size sorting channel circuit of the system of FIGURE 1;

FIGURE 8 diagrammatically illustrates a size counter circuit of the system of FIGURE 1;

FIGURE 9 diagrammatically illustrates a matrix circuit of the system of FIGURE 1; and FIGURE 10 diagrammatically illustrates a tally counter circuit of the system of FIGURE 1.

The illustrated system 20 operates to electronically analyze the spray from a spray nozzle 21 to determine droplet size distribution, so as to permit determination of the performance characteristics of the nozzle 21.

In the general operation of the system 20, a strobe flash lamp unit 22 is energized to develop an image on the screen of a television camera 23 through a lens system 24 thereof. The image on the camera tube screen is scanned line-by-line by the spot of the cathode ray beam of a camera tube. For example, a horizontal scanning frequency of 15,750 cycles per second and a vertical scanning frequency of 20 cycles per second may be used, so as to give 787.5 scanning lines per field.

The principle of operation is illustrated in FIGURE 2 which shows diagrammatically the upper portion of a scanning raster with the vertically spaced horizontal lines representing the path of movement of the spot in the scanning operation and with the circles 25, 26, 27, 28, 29 and 30 representing the outlines of droplet images developed by the flash illumination of the spray. To simplify and clarify illustration and discussion, the illustrated scanning lines are much fewer in number and are spaced much further apart than is generally the case in practice.

When the spot reaches a point as indicated by reference numeral 31 it intercepts the droplet image 25 near the top edge thereof and develops the leading edge of a pulse in the video signal. This leading edge of the video signal pulse initiates operation of a time delay circuit wherein the time delay is equal to the period of the horizontal line frequency of 15,750 cycles per second. At the end of one cycle of operation of the time delay circuit, when the spot is at a point 32 directly below point 31, an interrogation gate is operated. If a video signal of sufficient amplitude is then present, as is the case in this illustration, the time delay circuit is operated through another cycle to again operate the gate when the spot reaches a point 33 directly below the points 31 and 32 and the time delay circuit is then operated through another cycle to again operate the gate when the spot reaches a point 34, and finally the time delay circuit is operated through still another cycle to again operate the gate when the spot reaches a point 35. At this time, there is no video signal and the operation of the time delay circuit is discontinued after four cycles of operation thereof. The time delay circuit is then in condition to respond to the interception of another droplet. It will be appreciated that the number of cycles of operation of the time delay circuit is a measure of the diameter of the droplet image 25. By developing a pulse in each cycle of operation of the time delay circuit and counting the number of pulses, the size of the droplet images determined with a degree of accuracy determined by the spacing of the scanning lines in relation to the size of the droplet image.

As shown, more than one droplet image may be positioned on one horizontal scanning line, which could cause the system to miss droplets and operate improperly. To obviate this possibility, a multiple channel system is employed, with a time delay circuit and an interrogation gate in each channel. In the illustrated system, five size sorting channel circuits 36–40 are used each having a time delay circuit and an interrogation gate. The outputs of the size sorting channel circuits 36–40 are connected to size counters 41–45 while the inputs of the size sorting channel circuits 36–40 are connected to outputs of a channel selector circuit 46 and also to the output of a video processing and shading circuit unit 47 which is connected to the video output of the camera 23. The unit 47 compensates for variations in "port-holing" or "tilting" and the effects of uneven lighting and also compensates for characteristic defects of the camera tube of the camera 23, which may preferably be a vidicon. The unit also operates to refer all video pulses (corresponding to droplets) to a flat electrical base line. In addition, the video signal is passed or rejected by an amplitude discriminator and those pulses which are passed are squared and the video rise time is checked to provide a basis for accepting or rejecting a particle for good or poor focus.

In the channel selector operation, the video pulse initiated when the spot is positioned at point 31 on the droplet image 25 is fed to the size sorting channel 36 to initiate operation of the time delay circuit thereof. Another video pulse is initiated when the scanning spot reaches a point 49 on the droplet image 26. Through the operation of the channel selector circuit 46, this pulse is fed to the second size sorting channel circuit 37 to initiate operation of the time delay circuit thereof.

In the next scanning line, the leading edges of five video pulses are developed at points 50, 51, 52, 53 and 54 on the droplet images 25, 26, 27, 28 and 29 respectively. Through operation of certain blind gates the first two of such pulses are not fed to the third and fourth size sorting channels 38 and 39, since improper operation thereof would result. Instead, the video pulse developed when the spot reaches point 52 is fed to the third channel 38, the video pulse developed when the spot reaches point 53 is fed to the fourth channel 39, and the pulse developed when the spot reaches point 54 is fed to the fifth channel 40. Thus the time delay circuits of all five channels will be operative. With droplet images as diagrammatically illustrated in FIGURE 2, the time delay circuit of the first channel 36 will complete four cycles of operation, the time delay circuit of the second channel 37 will complete five cycles of operation, the time delay circuit of the third channel 38 will complete seven cycles of operation, the time delay circuit of the fourth channel 39 will complete four cycles of operation, and the time delay circuit of the fifth channel 40 will complete ten cycles of operation. Thus four pulses are applied to the first counter 41, five pulses to the second counter 42, seven pulses to the third counter 43, four pulses to the fourth counter 44 and ten pulses to the fifth counter 45.

At a point 55, the scanning spot intercepts the droplet image 30 to initiate another video pulse. At this point, the time delay circuits of the third and fifth channels 38 and 40 will be in operation. However, the time delay circuit of the first channel 36 and also the time delay circuits of the second and fourth channels 37 and 39 will have completed their operation. This pulse is accordingly fed to the first channel 36 to initiate another counting operation.

Means are provided for registering and recording the number of droplets falling into each of a plurality of size classifications, nine size classifications being used in the illustrated system. For this purpose, the size counters 41–45 have outputs coupled through coincidence gates to ten sections of a gating matrix 56 and through a code operated switch thereof to nine output lines which are connected to the inputs of nine tally counters 57–65. It may be noted that the number of sections of the matrix 56 depends upon the desired size capabilities of the system. In operation, when the time delay circuit of any one of the size sorting channels 36–40 stops operating, after developing a number of pulses corresponding to the size of a droplet image, a readout pulse is applied to the associated one of the size counters 41–45. Signals are then applied through the coincidence gates to the associated section of the gating matrix 56 and through the code operated switch thereof to develop an output on one of the output lines to apply an input pulse to one of the tally counters 57–65. By way of example, signals may be applied to the tally counters 57–65 in accordance with the size of a droplet as measured in lines, according to the following table:

| Tally counters: | Number of lines |
| --- | --- |
| 57 | 4 |
| 58 | 5 |
| 59 | 6 |
| 60 | 7–8 |
| 61 | 9–10 |
| 62 | 11–13 |
| 63 | 14–16 |
| 64 | 17–21 |
| 65 | 21–31 |

For instance, if 11–13 output lines are registered on one of the size counters 41–45 when a readout pulse is applied, an input signal may be applied to the tally counter 62.

The actual sizes of the droplets so registered will of course depend upon the magnification of the lens system 24 of the television camera 23. By way of example, four optical ranges may be used wherein the 4–31 line range corresponds to droplets having sizes in the ranges of 20 to 130 microns, 100 to 650 microns, 500 to 3250 microns, or 2500 to 16,250 microns.

The tally counters 57–65 develops signals of analog form which are applied to suitable meters and also to a sampling switch 66 which is connected to a strip chart recorder 67. The sampling switch 66 may preferably be in the form of an electro-mechanical switch which successively steps through nine positions to succesively connect the analog outputs of the tally counters to the recorder. It may for example be operated at one step per second to apply a succession of DC levels of one second duration corresponding to the analog counts of the tally counters 57–65.

The recorder 67 preferably comprises a stylus motor responsive to such DC levels with a count of 1000 corresponding to full deflection of the stylus. The recorder may for example be set to run at the rate of 25 millimeters per second, to draw a line 25 millimeters long for the output of each of the nine channels, resulting in a bar graph depicting the size distribution of the various particle sizes.

To synchronize the operation of the camera 23 and the counting and registering circuits with the operation of the flash lamp unit 22, a timing generator 68 is provided which preferably divides a 60 cycle power line frequency down to 20 cycles to control the vertical sweep of the camera through a line 69, and divides down further to four cycles per second to apply triggering signals through a line 70 to the strobe flash unit 22.

The timing generator 68 also generates horizontal drive pulses which are applied through a line 71 to the camera 23. The timing of such pulses is controlled from a high frequency oscillator 72, operated at 4.032 megacycles which is connected to the input of a divide-by-256 circuit 73, pulses at the rate of 15,750 per second being applied from the output of the divider circuit 73 to the timing generator 68.

Referring now to FIGURE 3, which is a circuit diagram of the timing generator 68, the timing generator 68 functions to develop a four cycle per second strobe drive signal on an output terminal 75, a 20 cycle per second vertical drive pulse signal on an output terminal 76, a 15,750 cycle per second horizontal drive pulse signal on an output terminal 77, a chart drive signal on an output terminal 78, connected to the chart recorder 67, a monitor synchronizing signal on an output terminal 79, and a clock relay signal on an output terminal 80 which may be used to energize an "on" time indicator or clock (not shown) which accumulates the total time that the system is in operation. In addition, the timing generator 68 generates a camera unblanking signal on an output terminal 81 and a video gate signal on an output terminal 82. The video gate signal is on only during the vertical scanning period of the first field immediately following the strobe flash.

In operation of the circuit, a 60 cycle power line signal is applied to an input terminal 83 which is connected to the input of a Schmitt trigger circuit 84 operated at the 60 cycle rate. The output of the Schmitt trigger circuit 84 is applied to the input of a divide-by-three circuit 85 which thereby develops a 20 cycle output signal applied through an emitter-follower 86 to a multivibrator 87 to develop a vertical drive pulse which is applied through a power driver stage 88 to the output terminal 76.

A 15,750 cycle per second signal is applied to an input terminal 89 connected to the input of a monostable horizontal drive multivibrator 90 which develops horizontal drive pulses applied through a power driver 91 to the output terminal 77.

Vertical and horizontal drive pulses at the output terminals 76 and 77 are combined by an OR gate 92 and are applied through an inverter 93 and a power driver stage 94 to the output terminal 79 which is connected to a monitor 95 to apply a synchronizing signal thereto.

To initiate operation of the system, a start button 97 may be depressed to apply a signal from an input terminal 98, connected to a suitable voltage source, to an input of a flip-flop 99 which is then placed in a set condition. A signal is then applied through a power driver 100 to the clock relay output terminal 80. In addition, an AND gate 101 is enabled. A four cycle per second signal is then applied from a multivibrator 102 to a multivibrator 103 connected through a neon driver stage 104 to the output terminal 75. Multivibrator 102 receives a four cycle per second input signal from an emitter-follower 105 connected to the output of a divide-by-five circuit 106, the input of the circuit 106 being connected to the 20 cycle per second output of the divide-by-three circuit 85. It may be noted that the multivibrator 102 provides a short delay from the output pulses from the divider 106 to the start of the strobe drive pulses generated by the multivibrator 103.

To generate the video gate signal on the output terminal 82, the terminal 82 is connected through an emitter-follower 107 and an inverter 108 to the output of an AND gate 109, one input of which is connected to the set output of the flip-flop 99. The other input of the gate 109 is connected to the output of another AND gate 110 having one input connected through a selector switch 111 either to an output of the divide-by-three circuit 85 or to a terminal 112 which may be connected to a suitable DC source. The other input of the gate 110 is connected to a set output terminal of a flip-flop 113 having a set input connected to a reset output of a flip-flop 114. A set input of the flip-flop 114 is connected to the output of the strobe drive multivibrator 103, while a reset input of the flip-flop 114 is connected to an output of the multivibrator 87 to reset the flip-flop 114 at the end of a vertical drive pulse generated by the multivibrator 87. In addition, a reset input of the flip-flop 113 is connected to the output of the multivibrator 87. The operation is described below in connection with the waveform diagram of FIGURE 4.

To generate the camera unblank signal on the output terminal 81, a flip-flop 115 is provided having a set output connected through a power driver 116 to the terminal 81. A set input of the flip-flop 115 is connected to an output of the divide-by-five circuit 106 while a reset input of the flip-flop 115 is connected to the set output of the flip-flop 113.

Figure 4:
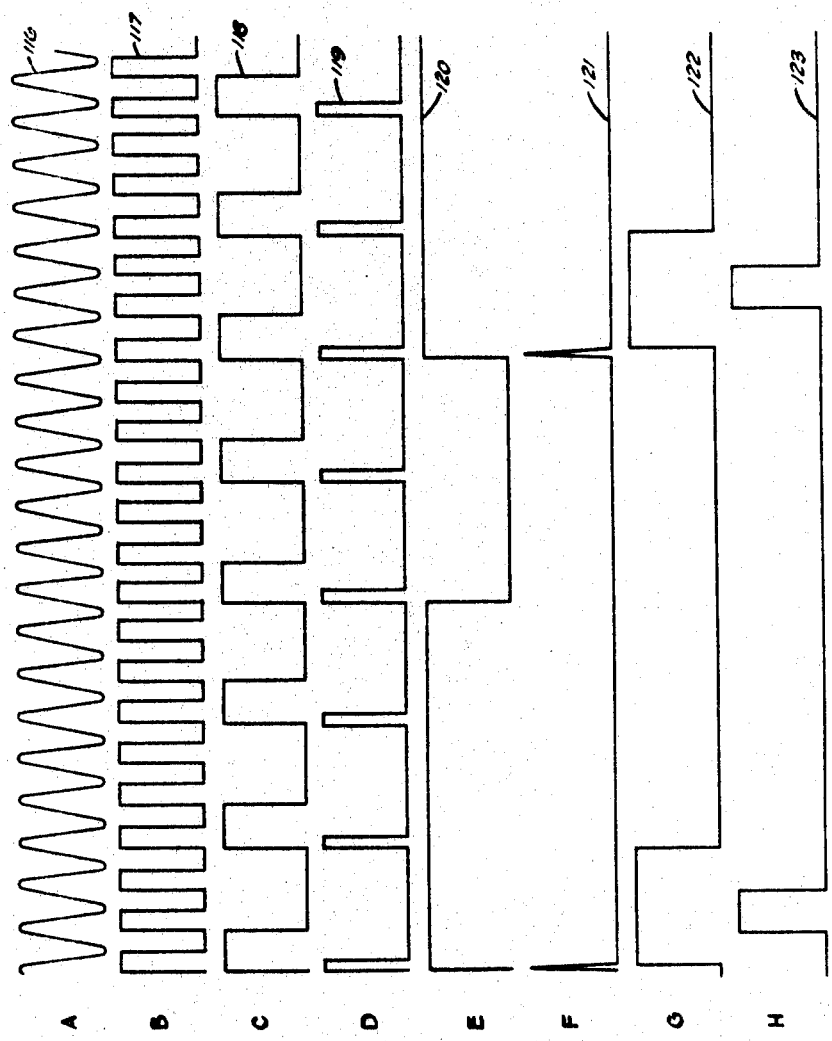
FIGURE 4 shows waveforms produced at various points of the circuit of FIGURE 3.

Referring now to FIGURE 4, line 116 depicts the 60 cycle signal which is used to drive the Schmitt trigger circuit 84 which forms rectangular 60 cycle pulses as depicted by line 117. Line 118 depicts a series of 20 cycle rectangular pulses generated by the divide-by-three circuit 85. The leading edges of the 20 cycle pulses are used to trigger the vertical drive multivibrator 87, the output of which is shown by line 119. The vertical drive pulses are also used to blank the camera during the vertical retrace period. Line 120 shows a four cycle per second pulse train developed by the divide-by-five circuit 106. The leading edges of the four cycle pulses of line 120 are used to trigger the multivibrator 102 which has a short delay and in turn triggers the multivibrator 103 to develop strobe drive pulses shown by line 121. The strobe drive trigger pulses fall within the vertical drive pulses of line 119 so that the strobe lamp is fired during the vertical retrace period when the camera is blanked off.

Line 122 shows a video gate signal which is derived from the four cycle pulses, the flip-flop 114 being set by pulses from the output of the multivibrator 103 and being thereafter reset by a signal from the multivibrator 87 at the end of a vertical drive pulse, flip-flop 113 being then operated to a set condition to enable the gate 110. The flip-flop 113 is thereafter reset by the next 20 cycle vertical drive pulse from the output of the multivibrator 87.

Line 123 shows an alternate gate signal which is controlled by the switch 111, wherein there is selected only the center one-third portion of the field following the strobe trigger.

The video processing and shading circuits 47 are shown in FIGURE 5. The purpose of video processing is to transform the analog video signal from the camera to a quantitized video signal wherein the peripheries of the particles are accurately defined and to determine whether or not the particles are sufficiently in focus to be counted. In order to quantitize the video signal by means of the amplitude discriminator, it is first necessary to add corrective shading signals to the video signal and to maintan an exact relationship between the white level of the video signal and the amplitude discriminator reference level.

Shading corrections are necessary due to deficiencies of the camera tube which is preferably a vidicon. These deficiencies present themselves in the form of "port-holing" or darkening around the edges and might be caused by improper beam alignment of the vidicon, uneven target surface on the vidicon caused by defects in manufacturing or by beam landing errors generated within the deflection system. The shading waveforms are made available at both horizontal and vertical rates in the form of sawtooth and parabolic voltages. The vertical shading signal is generated by a circuit 125 having an input connected to an input terminal 126 which is connected to the vertical drive pulse output terminal 76 of the timing generator 68. The horizontal shading signal is generated by a circuit 127 which is connected through inverters 128 and 129 to the output of a monostable multivibrator 130 having an input connected to the output of another monostable multivibrator 131, the input of the multivibrator 131 being connected to an input terminal 132 to which horizontal drive pulses are applied from the output terminal 77 of the timing generator 68. The multivibrator 131 operates to provide a delay, preferably on the order of 2 microseconds, with the multivibrator 130 being operative to then generate a pulse of a short duration, preferably on the order of 5 microseconds.

The vertical shading circuit 125 may be constructed in a fashion similar to the horizontal shading generator 127, except for differences in time constants and the like due to the different frequencies of signals. In each circuit sawtooth and parabolic signals of selected amplitudes and polarities may be applied to mixing amplifiers. The sawtooth voltage may be generated by using a relatively long time constant RC circuit in the collector of a transistor amplifier, which may be applied to a split load amplifier to provide sawtooth voltages of both polarities, one inverted with respect to the other. The desired amplitude of either polarity may then be selected by adjusting suitable potentiometers. From the push-pull sawtooth forming circuit, both polarities of parabolic correction voltages may be formed by integrating the sawtooth voltages by means of RC circuits. Here again, the desired amplitude of the proper polarity parabolic signal may be selected by suitable potentiometers and fed to the mixing amplifier.

The outputs of the vertical and horizontal shading circuits 125 and 127 are fed to a mixing amplifier 133, the output of which is applied through an emitter-follower 134 to an input of a video amplifier 135. Another input of the video amplifier 135 is connected through a low pass filter 136 to an input terminal 137 to which a composite video signal is applied from the camera 23.

The filter 136 may preferably have a cutoff of approximately 2.5 megacycles and eliminates undesirable signal components and noise from the video signal.

The combined video signal and corrective shading voltages developed at the output of the video amplifier 135 are fed through an emitter-follower 138 to an amplitude discriminator 139. However, at this point, a key clamp signal is applied from a circuit 140 connected to the output of the inverter 129. The key clamp circuit 140 serves to clamp the video signal to a reference voltage at the beginning of each horizontal line. In order to achieve clean clamping of the signal, it is necessary that the clamping action take place well within the horizontal blanking interval, and it is for this purpose that the delay multivibrator 131 is provided.

An important feature is in the application to the key clamp circuit of a reference voltage which automatically corrects for variations in a white level component of the video signal. In particular, the signal from the output of the filter 136 is applied through an amplifier 141 to a white level correction circuit 142 which applies a reference voltage to the key clamping circuit 140 through an emitter-follower 143. The white level correction circuit 142 may preferably comprise a coupling capacitor and a load resistor forming a network having a time constant which is a compromise between being very short for the field rate and long compared to a horizontal period. The signal across the load resistor needs to have equal areas above and below ground potential and when the white level increases, the peak-to-peak signal out of the camera increases so that the portion of the video waveform which goes positive above ground potential will also increase by a proportioned amount. The signal across the load resistor is then clipped by a second amplitude discriminator so that the video information is not included in the correction signal. It will be appreciated that suitable gain adjustment potentiometers are included in these circuits and with proper settings of video gain and white level correction gain, a change of 0.1 volt in the video channel will be meshed by 0.1 volt in the correction signal and will therefore cancel when added at the keyed clamp circuit 149.

The output of the amplitude discriminator 139 is applied through an emitter-follower 144 to an amplifier 145 which may preferably be a four stage amplifier operating to amplify the pulses of video passed by the amplitude discriminator to a uniform level and thus produce squared-off pulses. These squared-off pulses are applied to one input of an AND gate 146 having two other inputs. One other input is the video gate signal from the output terminal 82 of the timing generator 68 which is applied to an input terminal 147 and from there through an inverter 148 to the gate 146. The remaining input of the gate 146 is a horizontal blanking signal which is applied from a multivibrator 149 through an inverter 150. The input of the multivibrator 149 is connected to an input terminal 151 which is preferably connected to an output of the divide-by-156 circuit 73, where an early horizontal drive pulse is generated.

Accordingly, the gate 146 is enabled during the vertical scanning period of the first field immediately following the strobe flash, except during the horizontal blanking interval, and passes the squared-off pulses from the amplifier 146. Such pulses are applied through an emitter-follower 152 to an OR gate 153 and also to a multivibrator 154 connected through an emitter-follower 155 to the OR gate 153. Thus the output of the OR gate 153 is the additive combination of the video pulses plus a derived pulse from the multivibrator 154 triggered by the leading edge of the particle pulse. The purpose of the multivibrator 154 is to create a solid pulse for particles which may have a hole in the center of their image.

From the gate 154, the video pulses are amplified and inverted by an inverter 156 and are transmitted by an emitter-follower 157 to an output terminal 158. Terminal 158 is connected to the size sorting channels 36–40 where the signal is sampled at certain times by interrogation gates, described hereinbelow.

The output of the emitter-follower 157 at the output terminal 158 is in the form of negative squared video pulses which are inverted by an inverter 159 and are applied to an AND gate 160 the output of which is connected through the emitter-followers 161 and 162 to an output terminal 163. The gate 160 has a second input connected through an emitter-follower 164 to an input terminal 165. A signal is applied to input terminal 165 which is the sum of five blind gate circuits in the size sorting channel circuits 36–40, and the purpose is to prevent pulses from being passed by the gate 160 if a counter circuit has already started to count the pulses corresponding to the same particle. Accordingly, a signal is developed at the output of the gate 160, and a corresponding signal at the output terminal 163, which is a positive squared video pulse corresponding to the first intercept of any given particle. Such pulses are applied as start pulses to measuring circuits in a manner as described hereinbelow.

A negative squared video signal used for monitor presentation is also generated in the circuit 47. In particular, an OR gate 166 combines the squared video pulses from the output of the gate 153, the vertical drive signal from the input terminal 126 and a horizontal gate signal applied from the output of the multivibrator 149 through an emitter-follower 167. This composite signal is amplified and inverted by an inverter 168 and is applied through an emitter-follower 169 to an output terminal 170 which is connected to the monitor 95.

The remaining portion of the circuitry illustrated in FIGURE 5 is for focus discrimination. The output of the amplitude discriminator 139 through the emitter-follower 144 is transmitted to an amplifier 171 which may preferably have a gain control associated therewith. The output of the amplifier 171 is differentiated by a circuit 172 and then amplified by an amplifier 173 and applied to an amplitude discriminator or clipper 174. The amplitude of the differentiated pulses at the output of the amplifier 173 is dependent upon the rise time of the video signal as it was passed by the amplitude discriminator 139. Particles which were in sharp focus have a fast rise time while those in poor focus have a slow rise time and produce low amplitude differentiated pulses. If the focus is sufficiently sharp to produce pulses of large enough amplitude to be passed by the clipper or amplitude discriminator 174, they are then amplified by an amplifier 175 and are applied to an AND gate 176.

The gate 176 has a second input connected to the output of the inverter 150 which obviates the possibility of the blanking signal from the camera being passed as an in focus signal. The output of the gate 176 is applied to a multivibrator 177 which generates short duration pulses, preferably of 2 microsecond duration, which are applied through an inverter 178 and an emitter-follower 179 to an output terminal 180.

The functions of the channel selector circuit 46 and the size sorting channel circuits 36–40 are closely related since the circuit 46 operates to select individual ones of the circuits 36–40 as new particles are encountered. Each of the circuits 36–40 operates to measure the height or diameter of each individual droplet which is channeled to it by the selector circuit 46.

Referring to FIGURE 6, the channel selector circuit 46 comprises a ring counter which consists of five flip-flops 186–190 having outputs connected through emitter-followers 191–195 to AND gates 196–200 having outputs connected to output terminals 201–205. The ring counter is reset at the end of each vertical sweep by a verical drive pulse applied from the timing generator to an input terminal 206 connected to all of the flip-flops 186–190.

Assuming that the ring counter has been reset, only the output of the first flip-flop 186 will be "high" and only the first gate 196 will be open. The gates 196–200 have second inputs all of which are connected to an input terminal 207 to which a squared video signal from output terminal 163 of the circuit 47 is applied.

When a first particle is intercepted, the squared video pulse will be applied through the gate 196 to the output terminal 201 and from the output terminal 201 to the first size sorting channel 36 to initiate operation of a time delay circuit therein and to measure the size of the particle. In particular, a signal is applied to an input terminal 209 of the size sorting channel 36, shown in FIGURE 7, to trigger a flip-flop 210 to a set condition. The set output of the flip-flop 210 is then applied through an emitter-follower 211 and through a voltage reference shift network 212, consisting of Zener diodes, to an amplifier inverter 213 where it is applied to a gate 214. The other input to the gate 214 is connected through an inverter 215 to an input terminal 216 which is connected to the oscillator 72 so that high frequency pulses (4.032 megacycles) are applied to the gate 214. The output of the gate 214 is connected through an inverter amplifier 217 to a divide-by-256 circuit 218.

At the end of a time interval exactly equal to one scanning line interval, a pulse is developed at the output of the divider circuit 218 which is applied to a multivibrator 219. Multivibrator 219 generates a very short duration pulse, preferably on the order of 1 microsecond. This pulse is applied through an emitter-follower 220 into an interrogation gate 221. The gate 221 has a second input connected through an emitter-follower 222 to an input terminal 223 to which a negative squared video signal is applied from the output terminal 158 of the circuit 47.

It is at the interrogation gate 221 that the video signal is interrogated during each scanning line to determine whether or not a particle image is still present. The gate 221 will pass a signal only if both of its inputs are high. Since it is the negative polarity of the squared video signal which is applied to the gate 221, this means that during the scanning of a particle, the polarity of the video signal will be negative so that the gate 221 will be inoperative. As soon as the camera scanning has passed beyond a particle being counted, the video signal at input terminal 223 will then turn to white or positive. Accordingly, the interrogation gate pulse from multivibrator 219 will be passed by the gate 221. The output of the gate 221 is connected through an emitter-follower 224 to a reset input of the flip-flop 210 to reset the flip-flop 210 to its initial condition and to thereby close the gate 214. This completes one counting operation.

However, during the time when a particle is being counted, each interrogation pulse from the multivibrator 219 and the emitter-follower 220 is applied to an output terminal 225 which is connected to the size counter circuit 41. The circuit 41 then counts the number of pulses and determines the size of the particle being counted.

The circuit 36 also functions to form a blind gate pulse. In particular, an early pulse is taken from the divide-by-256 circuit 218 on a line 226 when a count of less than 256 is reached, preferably on the order of 240. This early pulse on line 226 triggers a multivibrator 227 which forms a blind gate pulse, preferably about 8 microseconds in duration. This pulse is shaped by an amplifier inverter 228 and is applied through a diode 229 to an output terminal 230. Terminal 230 and like terminals of the other size sorting channel circuits 37–40 are connected to the terminal 165 of the circuit 47, and the diode 229 together with like diodes of the other size sorting channel circuits form an OR gate. With the blind gate pulse from multivibrator 227 starting four microseconds ahead of the center line of a particle and having a duration of eight microseconds, it will be seen that it bridges or encloses any particle which has a diameter of up to a diameter corresponding to eight microseconds, or 32 pulses at the 4.032 megacycle rate.

The in focus pulses from output terminal 180 of the circuit 47 are applied to an input terminal 231 of the size sorting channel circuit 36 and also to like terminals of the other size sorting channel circuits 37–40. Such in focus pulses are passed by an emitter-follower 232 and are applied to a gate 233 having a second input connected through an emitter-follower 234 and an inverter 235 to the output of the inverter 228, at which the blind gate signal is developed. Accordingly, the gate 233 passes only in focus pulses which occur within the blind gate signal generated within the circuit 36. This is used to enable a size count transfer in a manner as described hereinbelow.

On the first interrogation pulse occurring after the scanning has passed through a particle image being measured, an output is present at the interrogation gate 221 which resets the flip-flop 210, as above noted, gate 214 being then closed to stop operation of the divider circuit 218. At this time, the reset output of the flip-flop 210 goes high and it is applied to a multivibrator 235 which after a certain delay produces an output which is applied to a second multivibrator 236. Multivibrator 236 produces a read pulse which is applied through an emitter-follower 237 to an output terminal 238 connected to the size counter circuit 41.

To advance the channel selector to enable the second size sorting channel circuit 37 to start counting a second particle, the set output from the flip-flop 210, applied through the emitter-follower 211, is differentiated by a circuit 239 and applied to an output terminal 240. Output terminal 240 is connected to a terminal 241 of the channel selector circuit 46. Similar output terminals of the other size sorting channels 37–40 are connected to terminals 242–245 of the channel selector circuit 46.

Terminals 241–245 are connected to inputs of an OR gate 246 the output of which is applied to a multivibrator 247 which is connected to all of the flip-flops 186–190 of the ring counter. The multivibrator 247 generates a pulse of a certain relatively short duration, preferably on the order of 10 microseconds, which advances the ring counter.

Accordingly, when the pulse generated by the first intercept of a first particle image in a field is applied through the gate 196 to the flip-flop 210 of the first size sorting channel 36, the flip-flop 210 is operated to a set condition to develop a pulse in the differentiating circuit 239 which is applied through the OR gate 246 to the multivibrator 247 which shifts the ring counter, whereupon the second flip-flop 187 thereof is set to enable the gate 197 with the other gates being closed. Upon the initial intercept of a second particle, a pulse is developed in like fashion in the second size sorting channel circuit 37 which is applied to terminal 242 of the channel selector circiut 46 and advances the ring counter to enable the third gate 198 with the remaining gates being closed. This sequence may be continued until all five size sorting channels are counting articles simultaneously. The blind gates of the circuits serve to prevent the counting of the same particle by more than one channel circuit.

As a particle is being measured by the size sorting channel 36, interrogation pulses (one for each scanning line that passes through the particle) leave the circuit 36 on the output terminal 225 and are applied to an input terminal 250 of the size counter 41. Input terminal 250 is connected to the trigger input of the first of five flip-flops 251–255 which form a binary counter. The set outputs of the flip-flops 251–255 are connected through emitter-followers 256 to five lines 261–265 which are connected through inverters 266–270 to an additional five lines 271–275. Accordingly, there are ten lines, one pair for each of the five binary stages of the counter defined by flip-flops 251–255 and the state of the ten lines changes as the count is accumulated. The lines 261–265 and 271–275 are connected through ten OR gates 276 and ten emitter-followers 277 to a series of ten output terminals 281–290.

The gates 276 are normally closed except when a transfor command is generated in the circuit of the size sorting channel, shown in FIGURE 7. Referring thereto, when the scanning of a particular particle image has been completed as signified by an output from the interrogation gate 221, the flip-flop 210 is reset and an output therefrom triggers the delay multivibrator 235 which in turn triggers the read multivibrator 236. The output of the read multivibrator 235 is applied through the emitter-follower 237 to the output terminal 238 which is connected to input terminal 291 of the size counter circuit 41. The delay multivibrator 235 of the circuit 36 also triggers another delay multivibrator 292 which after a certain delay resets a flip-flop 293, previously set by in focus pulses applied from the gate 233. The set output of the flip-flop 293 is connected through an emitter-follower 294 to an output terminal 295 and the set output of the flip-flop 293 is high after a first in focus pulse providing a high output on the output terminal 295 which lasts until after a read pulse on the output terminal 225.

Output terminal 295 of the circuit 36 is connected to an input terminal 296 of the counter circuit 41 to enable one leg of a three input gate 297. The read pulse applied to the input terminal 291 triggers a multivibrator 298 which generates a transfer gating pulse. This pulse is inverted and shaped by an amplifier inverter 299 and enables a second leg of the gate 297. The third leg of the gate 297 is enabled by the reset output of a flip-flop 300, the flip-flop 300 having been reset by a reset pulse applied from an input terminal 301 through an emitter-follower 302 to a reset line 303.

With gate 297 being so enabled, the transfer gating pulse is applied from the output thereof through an emitter-follower 304 to one leg of each of the ten gates 276 the other legs of which are connected to the lines 261–265 and 271–275. For each of the gates 276 having a high level as determined by the count registered in the flip-flops 251–255, the transfer gate pulse is transmitted therethrough and through one of the emitter-followers 277 to an output terminal. Accordingly, pulses appear simultaneously on five of the ten output terminals 281–290 shortly after the conclusion of the counting of a particle.

The transfer gating pulse from the multivibrator 298 through the inverter 299 is applied through an OR gate 306 and an inverter 307 to a multivibrator 308 connected to reset inputs of all of the flip-flops 251–255. The other input to the OR gate 306 is connected to a terminal 309 to which a common reset signal is applied. Thus a transfer pulse or a reset pulse, as the case may be, triggers the multivibrator 308 to reset all of the flip-flops 251–255. This signal is also applied through the emitter-follower 302 to the reset line 303 to reset the flip-flop 300.

The time delays of these circuits are adjusted in a manner such that at the last interrogation pulse, the counter chain 251–255 is advanced, then the state or number stored therein is read out and then the flip-flops of the counter chain are all reset to the initial zero count condition.

A flip-flop 310 is provided in the size counter circuit 41 for the special cases of particles falling in the channel IX size range, i.e. when the number of lines traversing the particle is from 21 to 31. Two five input AND gates 311 and 312 are provided. Gate 311 is connected to the binary lines 271, 262, 263, 274 and 265 in a manner such that it has an output only when the count stored in the chain 251–255 is equal to 22. Gate 312 is connected in the manner as illustrated such that it has an output only when the count is 31. If during the size counting operation, the count of 22 is reached, an output is then applied from the gate 311 to the flip-flop 310 to operate the flip-flop 310 to its set condition. A signal is then applied through a gate 313 and an emitter-follower 314 to an output terminal 315. In a manner as described hereinbelow, this signal is used to advance the channel IX tally counter 65. However, if the size count reaches a count of 31, or the maximum counting capability, an output is developed from the gate 312 which is applied through an OR gate 316 to reset the flip-flop 310. The gate 313 is then closed and the particle would not be counted in channel IX. If the operation should be continued beyond the count of 31, the counting chain 251–255 could be reset to start counting again from zero. To prevent this erroneous reading, the output from the gate 312 is also applied through an OR gate 317 to the flip-flop 300, to operate the flip-flop 300 to its set condition and close the gate 297, thereby preventing the transfer operation. The OR gate 317 has a second input connected to the output of an AND gate 320 having one input connected to an input terminal 321 and a second input connected to the output of a multivibrator 322 having an input connected to an input terminal 323. Terminal 321 is connected to an output terminal 324, whereby the blind gate signal is applied thereto, while input terminal 323 is connected to a terminal of the matrix 56 in a manner such as to trigger the flip-flop 300 to its set condition and prevent transfer of a count in the event of no in focus pulses applied to terminal 296.

The output terminals 281–290 of the size counter 41 and like output terminals of the other size counters 42–45 are respectively connected to inputs of five input OR gates 331–340 of the gating matrix 56 shown in FIGURE 9, the outputs of the gates 331–340 being connected through emitter-followers 341–350 to lines 351–360. Additional lines 361 and 362 are connected to suitable voltage sources, for example sources of plus 20 and minus 90 volts.

The illustrated matrix 56 has fourteen output lines 363–

376 connected through resistors 377, resistors 378 and/or diodes 379 to the lines 351–362 in the manner as illustrated in the drawing to produce output signals at the output terminals corresponding to the counts registered when a transfer pulse is applied.

Output lines 363–366, 375 and 376 are not used in the illustrated arrangement. Lines 367–374 are connected to the tally counters 57–65, respectively. A signal is developed on the output terminal 367 in response to a count of four, a signal on the output terminal 368 in response to a count of five, a signal on the output terminal 369 in response to a count of six, a signal on the output terminal 370 in response to a counte of seven or eight, a signal on the output terminal 371 in response to a count of nine or ten, a signal on the output terminal 372 in response to a count of from eleven to thirteen, a signal on the output terminal 373 in response to a count of from fourteen to sixteen, and a signal on the output terminal 374 in response to a count of seventeen to twenty-two. It will be appreciated of course that the arrangement of the diodes may be varied as desired in a particular application.

The circuit of the tally counter 57 is illustrated in FIGURE 10, it being understood that the other tally counters 58–65 have the same construction. The tally counter 57 comprises a series of ten binary flip-flops 381–390 which are reset by application of a reset signal to an input terminal 391 connected to the input of a multivibrator 392 having an output connected to reset inputs of the flip-flops 381–390. A trigger input to the first flip-flop 381 is connected to an input terminal 393 which is connected to the output terminal 367 of the gating matrix 56. Each time a particle of a given size range is counted, in this case a particle through which four scanning lines pass, the counter is advanced by the count of one. With ten binary stages, the counting capability is 1,032. Outputs are taken from only the seven highest order binary stages 384–390. These stages are connected through emitter-followers 394–400 and inverters 401–407 to inputs of seven transistor switches 408–414 which are used to connect a regulated voltage developed by a voltage regulator 415, preferably about 16 volts, to precision binary weighted resistors 416–422. The combined currents flowing through the resistors 416–422 are summed in two load resistors 423 and 424, each of which may preferably have a resistance of one ohm. With this arrangement, an analog voltage proportional to the registered binary count is developed. A meter 425 may be used to indicate the voltage, while an output terminal 426 is connected to the stepping switch 66 to be connected to the chart recorder 67. It may be noted that it is not necessary to read from all of the stages to achieve a high order of accuracy and by reading from only the highest seven binary stages 384–390, there are a possible 128 states, given readout accuracy of better than 1%.

The seven output lines from the emitter-follower 394–400 are connected to an AND gate 427, the output of which is applied through an emitter-follower 428 to an output terminal 429. This terminal may be connected to the terminal 381 to reset the counting chain and cause the counting operation to cease. The same is true on the channel II to channel VIII tally counters 58–64. On the channel IX tally counter 65, this output need not be used to stop the counting operation but instead it may set a flip-flop to cause an over-flow lamp to be energized and to signify that a full count has been reached in that channel.

It may be noted that with reference to FIGURE 3 showing the timing generator 68, the operation of the system may be stopped manually by operating a push button 430 to apply a signal through an OR gate 431 to the reset input of flip-flop 99 or the system may be stopped automatically by application of a signal to an input terminal 432 connected through the OR gate 431 to the reset input of the flip-flop 99. Input terminal 432 may be connected through a power drive 433 to the output terminal 78.

It will be understood that modifications and variations may be effected without departing from the spirit and scope of the novel concepts of this invention.

I claim as my invention:

1. In a television system for measuring dimensions of a plurality of objects including a television camera having a screen and deflection means for causing a cathode ray beam spot to traverse said screen in a line pattern,
   means for producing images of said plurality of objects on said screen to be traversed by said spot,
   a plurality of pulse counters,
   means for applying pulses to each pulse counter in response to each traverse of one image by said spot,
   a plurality of tally counters,
   a gating matrix between said pulse counters and said tally counters,
   and means for applying a readout signal to each pulse counter following the last traverse of an image by said spot to apply a signal to one of said tally counters through said gating matrix in accordance with the count registered in said pulse counter.

2. In a system for determining characteristics of an image in an image area,
   a high frequency pulse source,
   first frequency divider means connected to said pulse source to produce lower frequency synchronizing signals,
   means responsive to said lower frequency synchronizing signals for scanning said image area to produce a video signal,
   means for developing a control signal in response to a change in said video signal produced by a certain portion of an image,
   time delay means including second frequency divider means and a gate circuit controlled by said control signal between said high frequency pulse source and the input of said second frequency divider means,
   and interrogation gate means responsive to said time delay means and said video signal to sense the amplitude of said video signal at a certain time after said change in said video signal and thereby determine a characteristic of the image.

3. In a television system for measuring dimensions of a plurality of objects including a television camera having a screen and deflection means for causing a cathode ray beam spot to traverse said screen in a certain pattern to produce a video signal,
   means for producing images of said objects on said screen to produce pulses in said video signal in response to traverses of said images by said spot,
   a plurality of size sorting channel circuits each arranged to respond to pulses produced by a single object to develop an output signal corresponding to dimensions of an object, means for initiating operation of one channel circuit in response to pulses corresponding to one of the objects,
   and means for initiating operation of another of said channel circuits in response to pulses corresponding to another of the objects.

4. In an image analysis system,
   means including a lens and flash illumination means for producing images in an image area,
   means including a television camera having means for scanning said image area at a certain field rate and a certain line rate to produce a video signal having pulses therein corresponding to the images,
   analyzing means responsive to said video signal for producing output signals corresponding to characteristics of the images,
   means for periodically energizing said flash illumination means at a rate relatively low compared to said field rate,
   and gate means for rendering said analyzing means effective only in the first field scan immediately following each energization of said illumination means.

5. In a television system for measuring a dimension of an object including a television camera having a screen and deflection means for causing a cathode ray beam spot to traverse said screen in a line pattern,
- means for producing an image of the object on said screen to be traversed by said spot,
- a pulse counter,
- means for applying a pulse to said counter in response to each traverse of said image by said spot,
- a plurality of tally counters,
- a gating matrix between said pulse counter and said tally counters,
- and means for applying a readout signal to said pulse counter following the last traverse of an image by said spot to apply a signal to one of said tally counters through said gating matrix in accordance with the count registered in said pulse counter.

6. In a television system for measuring a dimension of an object including a television camera having a screen and deflection means for causing a cathode ray beam spot to traverse said screen in a line pattern,
- means for producing an image of the object on said screen to be traversed by said spot,
- a pulse counter,
- means for applying a pulse to said counter in response to each traverse of said image by said spot,
- a plurality of tally counters,
- a gating matrix between said pulse counter and said tally counters,
- means for applying a readout signal to said pulse counter following the last traverse of an image by said spot to apply a signal to one of said tally counters, through said gating matrix in accordance with the count registered in said pulse counter,
- a strip chart recorder,
- and sampler means arranged to sequentially apply outputs from said tally counters to said strip chart recorder.

7. In a television system for spray analysis including a television camera having a screen and deflection means for causing a cathode ray beam spot to traverse said screen in a certain pattern to produce a video signal,
- a spray nozzle,
- means for flash illumination of said spray from said nozzle,
- means for producing images of spray particles on said screen to produce pulses in said video signal in response to traverses of said image by said spot,
- means responsive to said pulses in said video signal to produce output signals corresponding to dimension of said images,
- means including tally counters responsive to said output signals to indicate particle size distribution,
- timing generator means for periodically operating said flash illumination means and said camera,
- and means for discontinuing operation of said timing generator means when one of said tally counter means reaches capacity.

8. In a television system for measuring dimensions of a plurality of objects including a television camera having a screen and deflection means for causing a cathode ray beam spot to traverse said screen in a line pattern to produce a video signal,
- means for producing images of the object on said screen to be traversed by said spot and to produce pulses in said video signal,
- trigger signal generator means for responding to leading edges of said pulses,
- a plurality of size sorting channels each arranged to respond to a trigger signal to produce output pulses at the line rate as long as a pulse in said video signal coincides with an output pulse,
- and channel selector means for sequentially initiating operation of said size sorting channels in response to triggering signals produced by the first traverses of object images by said spot.

9. In a television system for measuring dimensions of a plurality of objects including a television camera having a screen and deflection means for causing a cathode ray beam spot to traverse said screen in a line pattern to produce a video signal,
- means for producing images of the object on said screen to be traversed by said spot and to produce pulses in said video signal,
- trigger signal generator means for responding to leading edges of said pulses,
- a plurality of size sorting channels each arranged to respond to a trigger signal to produce output pulses at the line rate as long as a pulse in said video signal coincides with an output pulse,
- channel selector means for sequentially initiating operation of said size sorting channels in response to triggering signals produced by the first traverses of object images by said spot,
- and a size counter connected to each size sorting channel to respond to said output pulses thereof.

10. In a television system for measuring dimensions of a plurality of objects including a television camera having a screen and deflection means for causing a cathode ray beam spot to traverse said screen in a line pattern to produce a video signal,
- means for producing images of the object on said screen to be traversed by said spot and to produce pulses in said video signal,
- trigger signal generator means for responding to leading edges of said pulses,
- a plurality of size sorting channels each arranged to respond to a trigger signal to produce output pulses at the line rate as long as a pulse in said video signal coincides with an output pulse,
- channel selector means for sequentially initiating operation of said size sorting channels in response to triggering signals produced by the first traverses of object images by said spot,
- a size counter connected to each size sorting channel to respond to said output pulses thereof,
- and means for applying a readout signal to each size counter when there is no video signal pulse coincident with an output pulse of the corresponding size counter.

11. In a television system for measuring dimensions of a plurality of objects including a television camera having a screen and deflection means for causing a cathode ray beam spot to traverse said screen in a line pattern to produce a video signal,
- means for producing images of the object on said screen to be traversed by said spot and to produce pulses in said video signal,
- trigger signal generator means for responding to leading edges of said pulses,
- a plurality of size sorting channels each arranged to respond to a trigger signal to produce output pulses at the line rate as long as a pulse in said video signal coincides with an output pulse,
- channel selector means arranged for a stepping operation to sequentially couple said trigger signal generator means to said size sorting channels,
- normally open blind gate means for applying trigger signals from said trigger signal generator means to said channel selector means to control stepping operation thereof,
- and means responsive to each output pulse for closing said blind gate means after a first timing interval less than the duration of a scanning line and for opening said blind gate means after a time interval greater than the time to move across an object image of maximum size.

12. In a system for determining characteristics of images in an image area,
  means for scanning said image area with a spot moving in a line pattern to produce a video signal having pulses therein produced by traverses of images by the scanning spot,
  measuring means arranged to respond to the pulses produced by an image to determine characteristics of the image,
  means for sensing the effective slope of at least the initial pulse produced in response to traverses of an image by the scanning spot,
  and means responsive to said slope sensing means for rendering said measuring means ineffective when said effective slope is below a certain value.

13. In a system for determining characteristics of images in an image area,
  means for scanning said image area with a spot moving in a line pattern at a certain line rate to produce a video signal having pulses therein produced by traverses of images by the scanning spot,
  video signal amplifying means including keyed clamp means for clamping said video signal at a reference level at the beginning of each line scan,
  level correction means responsive to the average value of the video signal during the scanning of a line for adjusting said reference level,
  and measuring means arranged to respond to the video signal output of said amplifier means to respond to video pulses produced by an image to determine characteristics of the image.

References Cited

UNITED STATES PATENTS

| | | | |
|---|---|---|---|
| 2,419,914 | 4/1947 | Pamphilon | 88—14 |
| 2,791,695 | 5/1957 | Bareford | 88—14 |
| 3,073,521 | 1/1963 | Van Den Bosch | 235—92 |

ROBERT L. GRIFFIN, *Primary Examiner.*

DAVID G. REDINBAUGH, *Examiner.*

R. L. RICHARDSON, R. M. HESSIN,
  *Assistant Examiners.*